Nov. 28, 1967  R. J. KOERNER  3,355,705
ELECTRONIC DIRECTIONAL ERROR INDICATING SYSTEM
Filed April 23, 1963  3 Sheets-Sheet 1

RALPH J. KOERNER
INVENTOR.

BY Allen M. Sutton

ATTORNEY

Nov. 28, 1967  R. J. KOERNER  3,355,705
ELECTRONIC DIRECTIONAL ERROR INDICATING SYSTEM
Filed April 23, 1963  3 Sheets-Sheet 2
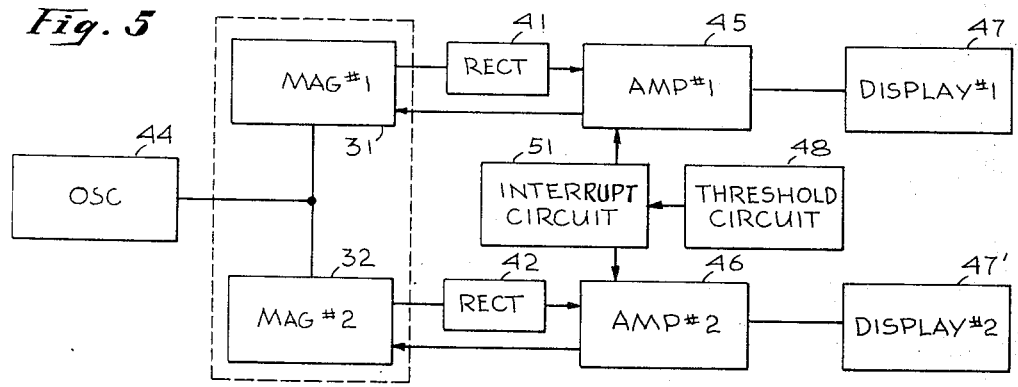
Fig. 5
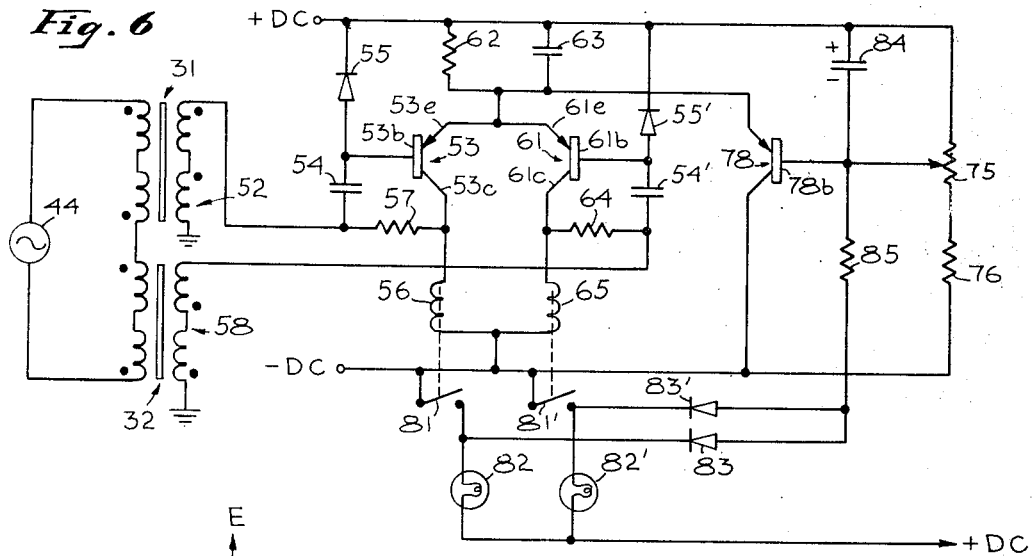
Fig. 6
Fig. 7
RALPH J. KOERNER
INVENTOR.
BY Allen M. Sutton
ATTORNEY Nov. 28, 1967  R. J. KOERNER  3,355,705
ELECTRONIC DIRECTIONAL ERROR INDICATING SYSTEM
Filed April 23, 1963  3 Sheets-Sheet 3
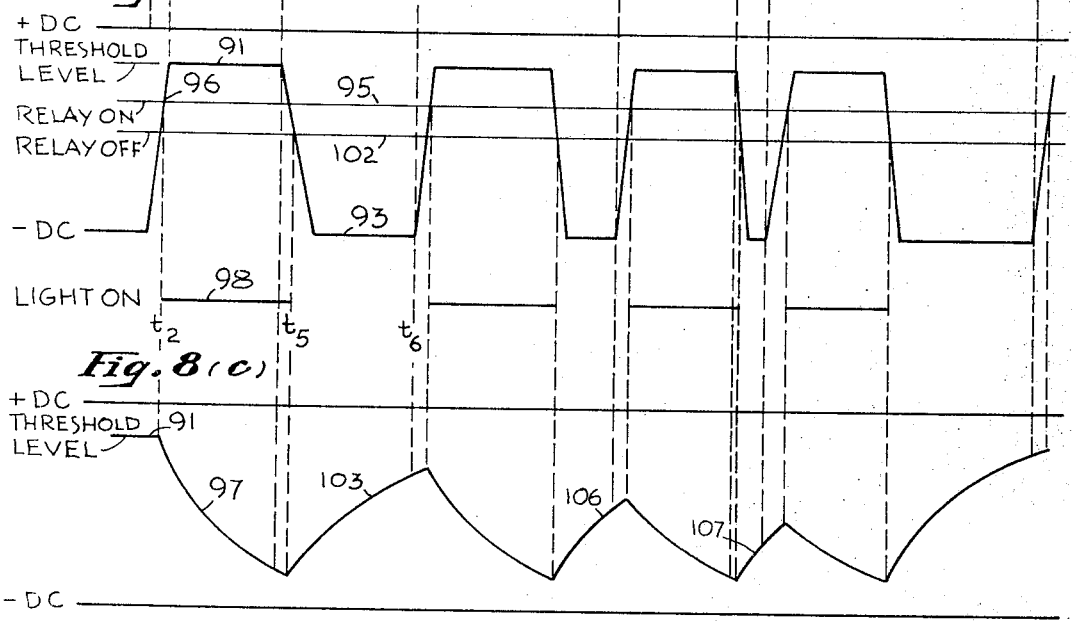
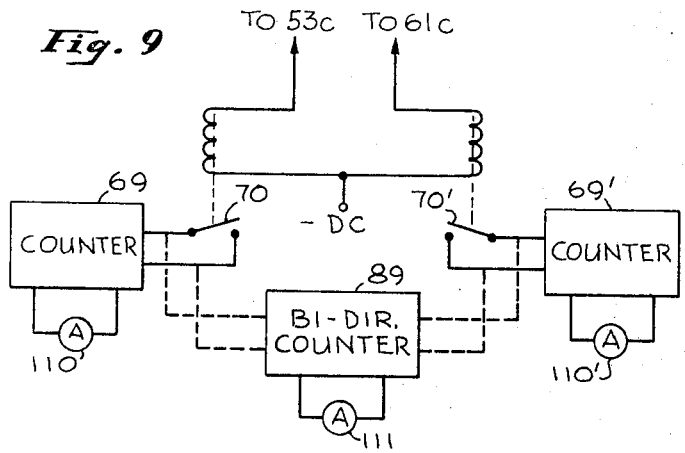
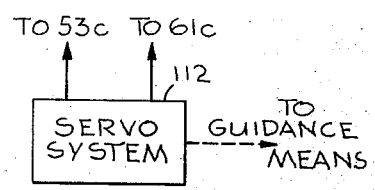
INVENTOR.
RALPH J. KOERNER
BY Allen M. Sutton
ATTORNEY

United States Patent Office 3,355,705
Patented Nov. 28, 1967

3,355,705
ELECTRONIC DIRECTIONAL ERROR
INDICATING SYSTEM
Ralph J. Koerner, Canoga Park, Calif., assignor, by mesne assignments, to The Bunker-Ramo Corporation, Stamford, Conn., a corporation of Delaware
Filed Apr. 23, 1963, Ser. No. 275,117
25 Claims. (Cl. 340—27)

The present invention relates to a novel system for detecting directional errors. More particularly, the invention is directed to a system wherein angular deviations of the heading of a body from a predetermined direction are detected electromagnetically and displayed for either manual or automatic correction of such heading.

Although there are various applications for the system of the invention, it finds special utility in the field of navigation. In navigating bodies in media such as water, air, or space, it is necessary to continuously monitor the direction of travel of the body and any deviation of it from a preselected course. Conventionally, a magnetic compass is used whereby the pointer position relates the direction of travel of the body to the magnetic poles of the earth. Various techniques have been used to obtain electrical signals for remote direction indication or automatic pilot control by various compass pointer position sensing means. Photoelectric and electrostatic techniques are among those used in converting pointer position to electrical signals. However, known instruments and devices are in general complex, delicate and, in many instances, insensitive and inaccurate despite the high cost of procurement and maintenance.

It is a primary object of the present invention to obviate the foregoing disadvantages and to provide a simple and rugged system for detecting directional errors between the direction of heading of a body and a predetermined direction.

Another object is to provide a system which is capable of highly accurate, repeatable performance.

Another object is to provide a directional error indicating system having an output signal display, which is convenient for manual interpretation and subsequent directional compensation.

Another object is to provide a system for a body, which is capable of detecting and displaying both the direction and magnitude of directional errors, and automatically correcting the heading of the body to correct those errors.

A further object is to provide a system which is as simple and inexpensive in cost and maintenance as is consistent with performance of the required functions.

The system of the invention operates on the principle of determining the heading of a body relative to the direction of the earth's magnetic field. In one embodiment, the system is so aligned on a navigable body that, when the body is following a proper course, the horizontal component of the earth's magnetic field sensed by the system is zero. If the body deviates from that course, the horizontal component sensed by the system increases from zero, and display means are energized to indicate the direction and magnitude of the error in the course of travel of the body. If desired, means may be provided for automatically correcting the error in the course.

Preferably, the system embodies two magnetic field sensing means such as single strip flux gate magnetometers. The magnetometers are positioned with their axes parallel and preferably are so mounted and balanced that their axes remain in a horizontal plane while they are rotatable about a vertical axis. Thus, the magnetometers sense the horizontal component of the earth's magnetic field. By rotating the magnetometers about a vertical axis, the value of the detected field strength may be set at zero for any desired course of travel of the navigable body, and any departure from that value indicates a directional error in the course of the body.

One feature of the invention is that only one magnetometer exhibits an informative signal output for a given direction of angular error or offset while the other magnetometer will exhibit such a signal output when the angular offset is in the opposite direction from the predetermined course of travel.

Another feature of the system is that the rate of display of directional deviation information is a function of the error angle as defined by the lines of the true and deviated courses of travel.

Further objects and advantages of the invention will become apparent from the following description, taken in conjunction with the accompanying drawings, in which:

FIG. 5 is a block diagram of apparatus embodying the present invention;

FIG. 6 is a schematic diagram of the apparatus shown in FIG. 5;

FIG. 7 is a graphical illustration of the response curve of a magnetic field sensing device wherein the output signal is plotted as a function of applied magnetic field values;

FIGS. 8a, b, and c are diagrammatic representations of various interrelated waveforms which illustrate the basic operation of the apparatus of the invention; and FIGS. 9 and 10 are diagrams of modified embodiments of the invention.

Figure 1:
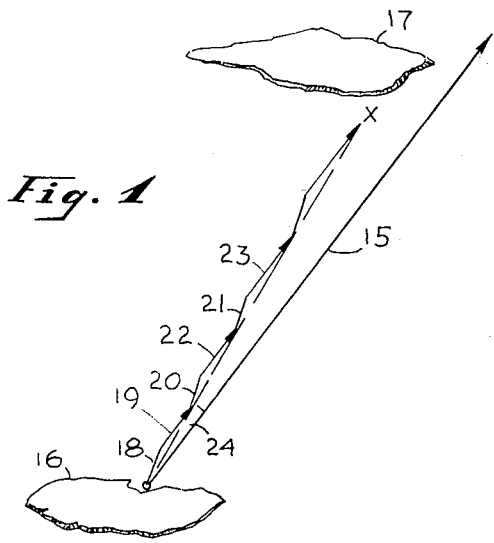
FIG. 1 is a diagrammatic illustration of possible navigational problems that the present invention aids in solving.

In order to facilitate an understanding of the invention and some of the navigational problems the invention helps to solve, FIG. 1 diagrammatically illustrates a predetermined course of travel 15 from a body of land 16, the course being so chosen as to bypass another body of land 17. Throught use of conventional direction indicators such as a compass, the navigator, after noticing a directional deviation 18 from the desired course, will generally return to a parallel course 19. Subsequent deviations 20 and 21 may be corrected by returning to parallel courses 22 and 23 respectively. However, such navigational corrections only maintain the navigated body on a line of travel parallel to its predetermined one and do not account for shift in absolute position from the selected line of travel. By utilizing the invention with its display means wherein the displayed values are directly related to the integrated angle of deviation 24, one familiar in the art may conveniently determine position X with respect to any other point of interest.

As hereafter described, one of the major features of apparatus embodying the invention is its ability to detect course deviation and further to direct the return of the navigated body to the intended line of travel rather than to a parallel line of travel.

Figure 2:
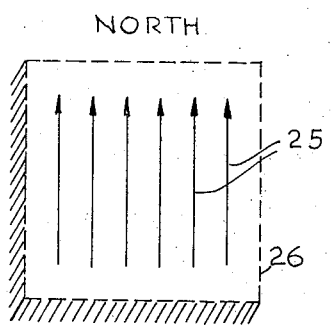
FIG. 2 is a diagrammatic illustration of the earth's ambient horizontal magnetic field in a plane parallel to a portion of the earth's surface.

As previously stated, the present invention incorporates magnetic field sensing devices capable of detecting component values of the earth's ambient horizontal magnetic field. In FIG. 2, lines 25 diagrammatically represent the earth's ambient horizontal magnetic field in a plane parallel to a portion of the earth's surface 26. Although the lines all point towards the magnetic north pole, they may be assumed to be substantially parallel over a relatively short distance.

Figure 3:
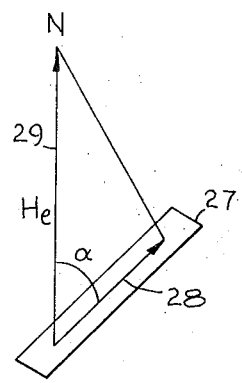
FIG. 3 is a diagrammatic illustration of the earth's ambient horizontal magnetic field as detected by a magnetic field sensing device positioned in a plane parallel to the earth's surface.

In FIG. 3, a magnetic field sensing device 27 similar to a flux gate magnetometer is illustrated as positioned with its long axis in a plane parallel to the earth's surface and forming an angle with respect to magnetic north. The vector component of the earth's horizontal magnetic field detected by the magnetic field sensing device along its long axis is represented by line 28 and is equal to $H_e \cos (\alpha)$, $H_e$ being the earth's ambient horizontal magnetic field as denoted by line 29, and $\alpha$ being the angle between the axis of the magnetometer and the lines of force of the earth's magnetic field. Considering for a moment the expression $H_e \cos (\alpha)$, it is clear that when the angle $\alpha$ approaches ninety degrees, the long axis of the magnetic field sensing device is substantially aligned in a west-east direction, the detected component of the earth's ambient horizontal magnetic field is minimal and becomes equal to zero when $\alpha$ equals ninety degrees. On the other hand, it should be equally clear that if the angle $\alpha$ equals zero degrees (which as will be seen hereinafter means that the angular deviation between the heading of the body and the intended course line is ninety degrees), then the magnetic field detected by the device 27 is equal to $H_e$.

Figure 4:
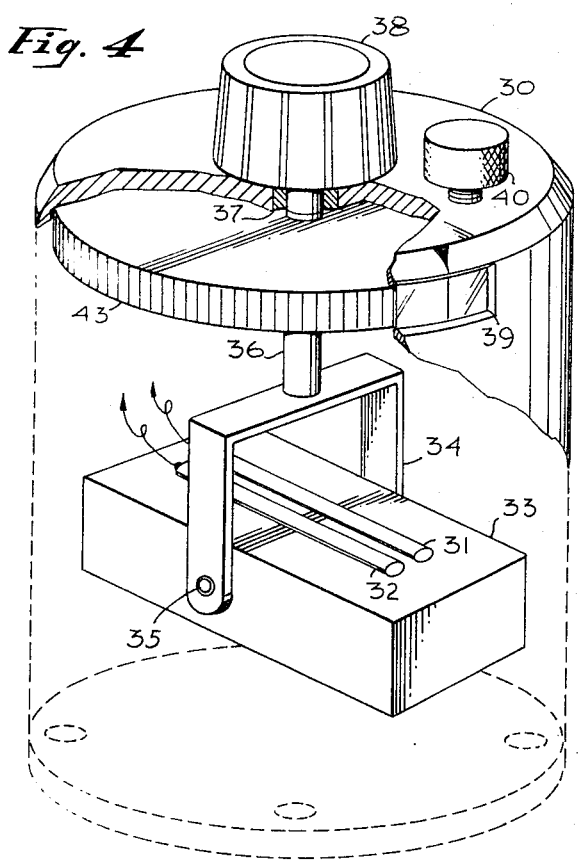
FIG. 4 is a perspective view of the mounting means for the magnetic field sensing devices.

FIG. 4 is a perspective view of the mounting means for the magnetic field sensing devices, with certain portions cut away for better viewing of the internal assembly. Within a housing 30, which is mounted in a navigational body, two magnetic field sensing devices, such as magnetometers 31 and 32, are mounted on a platform 33. The platform 33 is pivotally mounted within a suspension bracket 34 for movement about a horizontal axis defined by pivot pins 35. The platform 33 is so mounted and balanced that it maintains the axes of the magnetometers in a horizontal plane. A shaft 36 is mounted for rotation within a sleeve 37, which forms an internal part of the housing. The shaft 36 is connected at one end to the side of the suspension bracket and has a positioning knob 38 attached to its other end. By turning the positioning knob, the long axes of magnetic field sensing devices 31 and 32 can always be fixed to be in the west-east direction for any predetermined direction of travel. A knurled screw 40 or other means may be used to lock the shaft 36, and the direction of travel may be read from a dial 43 through a window 39. As long as that direction of travel is maintained, the magnetic field sensing devices will remain aligned in the west-east direction.

As noted previously, the amplitude of the component of the earth's ambient horizontal magnetic field detected by the magnetic field sensing devices depends on the angular offset of the magnetic field sensing devices with respect to magnetic north (see FIG. 3). It can, therefore, be stated that the magnetic field sensing devices 31 and 32 will detect components of the earth's ambient horizontal magnetic field, the amplitude of the detected magnetic field being directly related to the angular offset or directional deviation of the navigable body from its predetermined direction of travel.

The novel features of the present invention can better be understood by reference to FIG. 5, which is a highly simplified block diagram of apparatus embodying the invention. As there shown, an electrical oscillator 44 energizes magnetic field sensing devices, such as flux gate magnetometers 31 and 32. Basically, each magnetometer comprises an element which is sensitive to the strength or variations in the strength of magnetic fields in conjunction with an arrangement for detecting and amplifying indications provided by the element.

Each of the flux gate magnetometers 31 and 32 may utilize a strip of high permeability, magnetically saturable material as the core of the sensing element, a pair of oppositely wound windings each associated with a portion of the strip core and connected in series with an alternating-current signal oscillator 44 for driving the strip to provide detectable conditions therein responsive to ambient magnetic fields, and a pair of output windings associated with the strip for detecting the aforementioned fields.

The alternating-current input signal from oscillator 44 applied to the input windings yields an excitation field of such magnitude that the segments of the strip which are directly under the input windings are driven to magnetic saturation over a major portion of each half cycle. The sense of the input windings is such that the excitation field applied to the strip segment under one winding is equal in magnitude and opposite in sense to the excitation field applied to the strip segment which lies under the other input winding. The output windings are closely coupled to the input windings and are connected in series aiding to be individually responsive to the rate of change of the instantaneous flux in the associated strip segment. In the absence of an externally applied field, the net effect at the output windings is zero, and no output signal will result. However, when an external magnetic field of essentially constant magnitude and sense with respect to the period of one excitation cycle is applied to the strip, the strip segment under an input winding will be saturated for a longer period of time during that half cycle where the excitation field is in the same sense as that of the external field, and for a shorter period of time when the excitation field is in the opposite sense to the external field. Consequently, the previously existing symmetrical relationship between the flux in the respective portions of the strip is destroyed and as a result a net voltage is induced in the serially connected output windings. The voltage thus induced is a time-varying signal having a fundamental frequency which is twice the excitation frequency and varying in amplitude in proportion to the magnitude of the external magnetic field within the range of measurement of the magnetometer. Other magnetic field sensing devices capable of detecting the horizontal components of the earth's magnetic field may be used in practicing the present invention, the above description of flux gate magnetometers being presented for exemplary purposes only.

As previously described, both magnetometers are aligned to be parallel to one another and their long axes positioned in a substantially west-east direction or more exactly speaking, perpendicularly with respect to magnetic north for a particular predetermined direction of travel. The magnetometer 31 is connected through rectifier means 41 to an amplifier 45 with part of the output of the amplifier being fed back as bias to the output windings of the magnetometer. The magnetometer 32 is similarly coupled through rectifier means 42 to an amplifier 46. The output windings of the two magnetometers are wound with opposing winding polarities so that for a given direction of angular offset of the magnetometers from the west-east alignment, the feedback bias applied to one magnetometer is regenerative, making the apparent magnitude of the detected magnetic field seem greater than it actually is. Thus, that magnetometer saturates and delivers maximum output signal, while, at the other magnetometer, the feedback bias is degenerative, reducing the output signal to substantially zero. For an angular offset opposite in direction to the above described deviation, regeneration will occur in the previously degenerative circuit, while the output signal of the previously saturated circuit will substantially reach zero. Amplifiers 45 and 46 are connected to signal displays such as conventional indicator lights or counters 47 and 47', respectively. From the foregoing description of apparatus embodying the invention, it can be seen that the apparatus may detect angular offsets from predetermined directions of travel and further display the directions of such angular offsets, the latter feature depending on which one of the signal displays is being energized.

Apparatus embodying the present invention may further incorporate an adjustable threshold circuit 48 which controls the threshold sensitivity levels of both amplifiers 45 and 46, thereby controlling the minimum angular offset necessary to energize the amplifiers and in turn display the directional deviation. Another novel feature of apparatus embodying the present invention is an interrupt circuit 51 which further controls the operation of the amplifiers so that the rate of display of angular offset is a function of the magnitude of such offset.

Referring now to FIG. 6, it is seen that the magnetometers 31 and 32 are energized by electrical oscillator 44. Output windings 52 of the magnetometer 31 are connected through a capacitor 54 to the base 53b of a PNP type of transistor-amplifier 53. The base 53b is also connected to a source of positive potential (not shown) through a diode 55, the capacitor 54 and diode 55 acting to rectify the input to the transistor 53. The output voltage of transistor-amplifier 53 is taken from its collector 53c which is returned to a source of negative potential (not shown) through a relay coil 56. Part of the output voltage at the collector is fed back to the output windings of magnetometer 31 through a feedback resistor 57. The output windings 58 of magnetometer 32 are similarly connected to the base 61b of a PNP type of transistor-amplifier 61 through a capacitor 54', a diode 55' connects the base to the positive potential source. The capacitor 54' and diode 55' act to rectify the input to the transistor 61. The collector 61c of the transistor-amplifier 61 is connected to the output windings of the magnetometer 32 through a feedback resistor 64 and to the negative potential source through a relay coil 65. The emitters 53e and 61e of both transistor-amplifiers 53 and 61 are connected to the positive potential source through a parallel combination of a resistor 62 and a capacitor 63. The polarities of voltages appearing across the primary and secondary windings of the magnetometers 31 and 32 are indicated in conventional manner by means of dots.

According to the present invention, for any given angular offset or directioal deviation of the navigable body from the predetermined course of travel, either transistor-amplifier 53 or transistor-amplifier 61 will have an output signal of sufficient amplitude to energize one of the relay coils 56 or 65. This occurs because of the magnetometer-amplifier regeneration principle previously mentioned, and which can be better understood by referring to FIG. 7 wherein the rectified output of either magnetometer is plotted as a function of detected magnetic field intensity. Assume, for explanatory purposes, that both magnetometers have detected a component of the earth's ambient horizontal magnetic field of a positive polarity and amplitude as denoted by a line 66. Both magnetometers, therefore, will have initial error or output signals of amplitude indicated by a line 67, which will be amplified by their respective transistor-amplifiers and parts of the amplified signals will be fed back as biasing currents to each magnetometer. The effect of the biasing currents will differ in each magnetometer since the output windings of the two magnetometers are wound with opposite polarities with respect to one another. Therefore the biasing current in one magnetometer will tend to establish an apparent magnetic field in a direction which is additive to the deteced component of the earth's ambient horizontal magnetic field, resulting in an apparent higher value of magnetic field intensity, as at 68, and an apparent higher output signal level, as at 74. The output signal in turn will be amplified and further bias the magnetometer's output windings to increase the apparent magnetic field intensity until the output of the magnetometer reaches a saturation level. However, in the other magnetometer, the biasing current due to the reversed winding polarity will tend to establish an apparent magnetic field in a direction which is subtractive to the detected component of the earth's ambient horizontal magnetic field, thus resulting in an apparent lower value of magnetic field intensity, as at 71, and a lower output signal level, as at 72. This in turn will be amplified and further bias the magnetometer windings to further decrease the apparent magnetic field intensity until the output of this magnetometer will reach zero. With a sufficiently large feedback ratio, the magnetometer-amplifier loop gain is infinite and the circuit is bistable. By incorporating this circuit in the present invention, a system is provided wherein it is possible for a very small angular offset to cause the appropriate magnetometer-amplifier circuit loop to regenerate and "lockup" in saturation. This energizes the corresponding relay coil, which in turn causes the display means to indicate the direction of the angular offset from the predetermined course of travel.

For an angular offset opposite in direction from the foregoing example, both magnetometers will direct components of the earth's ambient horizontal magnetic field which appear to be opposite in polarity from those previously assumed. However, the previously degenerative magnetometer-amplifier loop will now be in a regenerative state, thereby reaching the saturation level and energizing its associated relay coil so as to cause its display means to indicate an angular offset as in the previous example but opposite in direction with respect to the predetermined direction of travel.

A system embodying the invention may further include a threshold circuit connected in series between the resistor 62 and the source of negative potential. The pickoff arm of the potentiometer 75 is connected to the base 78b of a transistor 78 whose emitter-collector circuit is connected between the emitters of the transistor-amplifiers 53 and 61 and the source of negative potential. By adjusting the potentiometer 75, and D-C bias on the base 78b of the transistor 78 is varied, which in turn controls the D-C bias level of the emitters 53e and 61e of the transistor-amplifiers 53, 61. This determines the minimum output signals from the magnetometers which are necessary to forwardly bias the emitter-base junctions of transistors 53 and 61, so that the previously described regeneration-degeneration action may occur. Therefore it is seen that by manually positioning the pickoff arm of the potentiometer 75, it is possible to control the minimum detectable angular offset which will energize the circuit and subsequently be displayed for manual or automatic correction.

A system embodying the invention may further incorporate an additional feature whereby the rate of display of the angular offset is related to the magnitude or the degree of offset from the predetermined course of travel. The latter feature of the invention may best be explained by referring to FIGS. 6 and 8a, b, and c. For explanatory purpose, it may be assumed that a navigable body has deviated from its predetermined direction so that the amplifier 53 (FIG. 6) and its associated magnetometer 31 are in the regenerative state as described hereinbefore. Relay coil 56 will therefore be energized, thus closing its normally open contact 81 thus connecting its associated display, such as an electronic lamp 82, between sources of positive and negative potential. The closing of the contact 81 results in a negative potential being impressed on the cathode of a diode 83 whose anode is connected to one side of a capacitor 84 and to the pickoff arm of the potentiometer 75 through a resistor 85. The capacitor 84, whose other side is connected to the positive potential source and which has previously been charged to a threshold voltage level determined by the setting of threshold-adjust potentiometer 75, will now start to charge further the rate of charge being controlled by the values of the capacitor 84 and the resistor 85. During this charge period, the potential at the base 78b of the transistor 78 will continuously drop, thereby lowering the potential of the three commonly tied emitters which in turn reduces the gain of the saturated transistor-amplifier 53. A time will be reached when the output of transistor-amplifier 53 is no longer sufficient to energize the relay coil 56, whereupon the contact 81 opens. This, in turn, deenergizes the display means 82 and also terminates the charging of the capacitor 84. The capacitor 84 will then discharge to its previous threshold level, the rate of discharging being a function of the time constant of the circuit comprising capacitor 84, resistor 76 and potentiometer 75. However, regeneration may occur even before capacitor 84 reaches the threshold level, the latter condition occurring when the amplitude of the output signal from the magnetometer 31 is sufficient to forwardly bias the base-emitter junction of amplifier 53 so that regeneration will take place, thereby re-energizing relay coil 56 and repeating the display cycle.

The relay coil 65, which is energized by the output of the other transistor-amplifier 61, also actuates a normally open contact 81'. When the relay coil 65 is energized and the contact 81' closes, display means 82' are connected between positive and negative sources of potential and the cathode of a diode 83' is connected to the negative source. The anode of the diode 83' is connected to the resistor 85, so that the capacitor 84 can be charged therethrough, when the contact 81' is closed, to provide the same interrupt action for the transistor-amplifier 61 as previously described for the transistor-amplifier 53.

FIGS. 8a, b, and c are diagrammatic representations of various interrelated waveforms of signals present in the transistor-amplifiers 53 or 61. For explanatory purpose, if it is assumed that the transistor-amplifier 53 is in the regenerative state, the waveforms of signals present at its base 53b, collector 53c and emitter 53e are represented by FIGS. 8a, b, and c, respectively. In FIG. 8a, the threshold level as adjusted by potentiometer 75 is indicated by a line 91, and the envelope of the rectified output signal from the associated magnetometer 31 is indicated by a line 92. As long as the rectified output signal from the magnetometer due to a directional deviation is not sufficient to drive the base 53b below the threshold potential, the amplifier 53 will be in a nonconductive condition, the D-C level of its collector 53c will be that of the negative potential to which it is connected (shown by a line 93) and its emitter 53e will be at threshold level. However, assuming that at a time denoted by line $t_1$, the directional deviation as detected by magnetometer 31 will be large enough to produce a negative output signal of sufficient amplitude to drive the base 53b of transistor-amplifier 53 below the threshold level 91, the magnetometer 31 and amplifier 53 will start their regenerative cycle, finally locking in the base at the saturation level (shown by a line 94) at time $t_3$. During the regenerative cycle, the collector potential will rise to threshold level 91, crossing a line 95 representing the minimum potential necessary to energize the relay coil 56 at time $t_2$, thereby energizing the relay coil 56 which closes contact 81 (FIG. 6). The closing of the contact 81 initiates the further charging of capacitor 84 through resistor 85 and diode 83, thereby indirectly reducing the D-C bias on the emitter 53e of the transistor-amplifier 53, as shown by a line 97. The closing of contact 81 further energizes the display means 82, as shown by a line 98, to indicate a directional deviation. The base 53b and collector 53c will remain substantially at their respective saturation and threshold levels until the emitter bias has been reduced through the charging of capacitor 84 to a level equal to the saturation level of base 53b, at which time ($t_4$) the base-emitter junction will no longer be forwardly biased, thus interrupting the magnetometer-amplifier regeneration cycle. The interruption will be manifested by the base 53b returning to a level as determined by the output signal from magnetometer 31, the amplitude of the output signal being a function of the degree of directional deviation from the predetermined course of travel. In FIG. 8a, the level that the base 86 returned to is indicated by a line 101, which is below the threshold level 91. As the base 53b changes from levels 94 to 101, the collector 53c changes from the threshold level 91 to the negative potential shown by the line 93. As the collector potential drops at time $t_5$ below a line 102, which represents the minimum potential necessary to maintain the energization of relay coil 56, the relay coil will no longer hold contact 81 in a closed position. When the contact 81 opens, it terminates the display means energization and further abruptly terminates the charging of capacitor 84, which now tends to discharge to the threshold level, as shown by a line 103. Amplifier 53 will be in an unsaturated state with capacitor 84 discharging until at time $t_6$ the capacitor potential reaches that of the level of base 53b, shown by the line 101, at which time regeneration will occur again, repeating the entire cycle just described. A study of FIG. 8 reveals that the period of interruption between display signals is a function of the discharge time of capacitor 84, as shown by line 103, but that period also depends on the amplitude of the unamplified output signal of the magnetometer which amplitude determines the point when regeneration will repeat itself. The greater the directional deviation of the navigable body from its predetermined course of travel, the greater the output signal of the magnetometer, the shorter the period between regeneration cycles as displayed by display means 82. Stated otherwise, it can be said that the frequency of occurrence of pulses in a pulse train developed by either amplifier 53 or 61 is proportional to the amplitude of the unamplified magnetometer output signal. For further clarification, FIG. 8 includes two additional diagrammatic representations of regeneration cycles. Lines 104 and 105 represent increasing amplitude output signals of the magnetometer in response to increasing directional deviations of the navigable body from its predetermined course of travel. Lines 106 and 107 indicate decreasing interruption periods between regeneration cycles, thereby further exemplifying the feature of this invention wherein the rate of display is a function of degree of directional deviation from a predetermined course of travel.

As previously stated and described in detail, apparatus embodying the present invention detects angular offsets or directional deviations from a selected course of travel and further displays said deviations so as to indicate the direction and degree of the deviation from said predetermined course. Apparatus embodying the present invention may further incorporate displays to enable either manual or automatic directional corrections so as to maintain the navigable body on its predetermined direction of travel.

In FIG. 6 displays 82 and 82', which are energized each regeneration cycle of their associated amplifiers, are represented by indicator lights. Such indicators may visually be used by a navigator or heelmsman for course correction, whereby any display and its rate by either indicator light, will indicate a course and magnitude of deviation in a certain direction from the desired course of travel. By manually returning and mantaining the navigable body on its course, neither of the displays will be energized, so that no display by either indicator indicates proper alignment with the predetermined course of travel.

In another embodiment of the present invention, shown in FIG. 9, indicator lights 82 and 82' may be replaced by or paralleled with counters. For example, a counter 69 may be connected to a normally open contact 70 associated with relay coil 56 so that the closing of the contact during each regeneration cycle of amplifier 53 pulses counter 70 to change its numerical readout value. Another counter 69' is similarly connected to a normally open contact 70' associated with relay coil 65. By maintaining both counters at their initial respective numerical readout values, the navigable body may be maintained on its true course. The changes in readout values of both counters may be detected visually by the navigator for course correction, and they may further be automatically sensed and used as input signals to a closed loop servo control system for automatic directional control correction, the latter circuit arrangement being well known in the art of automatic positioning control.

In a still further embodiment of the present invention, contacts 70 and 70' may be used as input leads to a bidirectional counter 89 having a preselected readout value which increases or decreases in response to the number and rate of the closings of the contacts 70 and 70'. By manually keeping the navigable body on course, the preselected readout value of the bidirectional counter will not be altered. However, the direction of change of that value, namely its increase or decrease, will indicate a navigational deviation in a particular direction which may be manully or automtically corrected as described hereinabove.

A further embodiment of the present invention incorporates alarm means 110, 110', and 111, which are so coupled to counters 69 and 69' or to counter 89, respectively, that whenever the preselected readout values of the counters have changed by more than a predetermined value, which is related to the integrated directional deviation in a certain direction from the predetermined direction of travel, the alarm means will be energized.

In a still further embodiment of the present invention shown in FIG. 10, the output signals of amplifiers 53 and 61 may be used directly as input signals to a closed loop servo position control system 112 for automatic control of the direction of travel. The output signals can also be transmitted for remote display and control of the course of travel of the navigable body.

It is apparent that the invention provides a system which has many applications, and it is therefore intended not to be limited by the specification embodiment shown or described. Various changes and modifications may be made by one skilled in the art without departing from the true spirit and scope of the invention.

I claim:

1. A system for detecting direction deviations of navigable means from a predetermined direction of travel comprising:
   first and second magnetic field sensing means carried by said navigable means for detecting components of the earth's ambient horizontal magnetic field, the amplitudes of detected components being a function of the degree of directional deviation of said navigable means from said predetermined direction of travel, said first and second magnetic field sensing means respectively providing first and second output signals whose amplitudes are substantially proportional to the amplitudes of said detected components of the earth's ambient horizontal magnetic field;
   first and second amplifying means respectively coupled to said first and second magnetic field sensing means for amplifying said first and second output signals to provide first and second amplified signals, respectively;
   means connected to said first and second amplifying means for feeding back at least a portion of said first and second amplified signals to said first and second magnetic field sensing means, respectively, for causing said first magnetic field sensing means and said first amplifying means to become regenerative when the directional deviation of said navigable means from said predetermined direction of travel is in one direction and for causing said second magnectic field sensing means and said second amplifying means to become regenerative when said directional deviation is in a direct opposite to said one direction; and
   utilization means connected to receive said first and second amplified signals for responding to directional deviations of said navigable means from said predetermined direction of travel.

2. The system defined by claim 1 wherein said first magnetic field sensing means and said first amplifying means are caused to be degenerative when said second magnetic field sensing means and said second amplifying means are regenerative, and said second magnetic field sensing means and said second amplifying means are caused to be degenerative when said first magnetic field sensing means and said first amplifying means are regenerative.

3. The system defined by claim 2 wherein said utilization means comprises at least two displays, at least one of said displays being energized to indicate a directional deviation of the heading of said body in a first direction from said predetermined direction of travel, and at least another one of said displays being energized to indicate a directional deviation of the heading of said body in a direction opposite to said first direction from said predetermined direction.

4. The system defined by claim 3 including means for periodically energizing said display means at a rate which is a function of the degree of directional deviation from said predetermined direction.

5. The system defined by claim 2 wherein said utilization means comprises a counter initially adjusted to a preselected numerical readout value, said counter being energized by said amplified output signals to increase its numerical readout to indicate directional deviation of the heading of said body in a first direction from said predetermined direction and to decrease its numerical readout to indicate directional deviation of the heading of said body in a direction opposite to said first direction from said predetermined direction, the rate of change of numerical readout being a function of the degree of directional deviation from said predetermined direction.

6. The system defined by claim 3, wherein said utilization means comprises servo means connected to return said navigable means to said predetermined direction of travel.

7. In an electrical indicating apparatus having amplifying means responsive to an input error signal for providing an output indicating signal,
   means coupled to said amplifying means for establishing a threshold amplitude whereby an input error signal having an amplitude greater than said threshold amplitude is amplified;
   means coupled to said amplifying means for recurrently disabling said amplifying means at a rate substantially proportional to the amount the amplitude of said input error signal exceeds said threshold amplitude; and
   display means responsive to said output indicating signal for indicating the rate at which said amplifying means is disabled.

8. Apparatus defined by claim 7, wherein
   said amplifying means comprises a transistor, and
   said means for recurrently disabling said amplifying means comprises means responsive to said output indicating signal for varying an electrical potential on an element of said transistor.

9. Apparatus defined by claim 7, wherein
   said amplifying means comprises a transistor,
   said means for establishing a threshold amplitude comprises means for establishing an electrical potential on an element of said transistor, and
   said means for recurrently disabling said amplifying means comprises means responsive to said output indicating signal for varying an electrical potential on an element of said transistor.

10. An electrical indicating apparatus comprising:
    first and second amplifying means each having an input terminal and an output terminal;
    first and second input error signal sources;
    means respectively coupling said first and second input error signal sources to said input terminals of said first and second amplifying means;
    means for cutting off conduction in said second amplifying means when said first amplifying means is conductive and for cutting off conduction in said first amplifying means when said second amplifying means is conductive;
    means for interrupting the conduction of the conductive amplifying means at a rate determined by the amplitude of the input error signal applied thereto to thus provide a series of output pulses whose frequency represents the amplitude of said input signal applied thereto; and display means for indicating the rate at which said conductive amplifying means is interrupted.

11. The apparatus of claim 10 including a counting means coupled to said output terminals of said first and second amplifying means for indicating the difference between the number of pulses supplied from each of said output terminals.

12. The apparatus of claim 10 wherein said first and second sources respectively comprise first and second magnetometers each having an output winding supplying one of said input error signals; and wherein said means for cutting off conduction includes first and second oppositely wound feedback windings respectively coupling said output terminals of said first and second amplifying means to said first and second magnetometers.

13. Sensing apparatus adapted to be mounted on a navigable body and responsive to the direction and magnitude of angular deviation of the heading of said body from a predetermined course line for facilitating the return of said body to said course line, said sensing apparatus including:

first magnetic sensing means for providing a first error signal in response to the detection of a horizontal component of the earth's magnetic field extending in either a first or second direction along a defined axis;

second magnetic sensing means for providing a second error signal in response to the detection of a horizontal component of the earth's magnetic field extending in either a first or second direction along said defined axis;

first and second circuit means each having an input terminal and an output terminal;

means respectively applying said first and second error signals to the input terminals of said first and second circuit means; and first and second feedback means respectively coupling said output terminals of said first and second circuit means to said first and second magnetic sensing means for aiding said horizontal component sensed by one of said sensing means and opposing said horizontal component sensed by the other of said sensing means.

14. Sensing apparatus adapted to be mounted on a navigable body and responsive to the direction and magnitude of angular deviation of the heading of said body from a predetermined course line for facilitating the return of said body to said course line, said sensing apparatus including:

first magnetic sensing means for providing a first error signal in response to the detection of a horizontal component of the earth's magnetic field extending in either a first or second direction along a defined axis;

second magnetic sensing means for providing a second error signal in response to the detection of a horizontal component of the earth's magnetic field extending in either a first or second direction along said defined axis;

first and second circuit means each having an input terminal and an output terminal;

means respectively applying said first and second error signals to the input terminals of said first and second circuit means;

first and second feedback means respectively coupling said output terminals of said first and second circuit means to said first and second magnetic sensing means for aiding said horizontal component sensed by one of said sensing means to thus increase the error signal provided thereby and opposing said horizontal component sensed by the other of said sensing means to thus cancel the error signal provided thereby whereby the circuit means to which said increased error signal is applied will be conductive and the circuit means to which said cancelled error signal is applied will be cut off; and means for interrupting the conduction of said conductive circuit means at a rate determined by the amplitude of said horizontal component to thus provide a series of output pulses whose frequency represents the amplitude of said horizontal component.

15. The apparatus of claim 14 including a counting means coupled to said output terminals of said first and second amplifying means for indicating the difference between the number of pulses supplied from each of said output terminals.

16. Apparatus responsive to the direction and magnitude of angular deviation of the heading of a navigable body from a predetermined course line for facilitating the return of said body to said course line, said apparatus including:

first means responsive to an angular deviation in a first direction from said predetermined course for providing pulses at a rate related to the magnitude thereof;

second means responsive to an angular deviation in a second direction from said predetermined course for providing pulses at a rate related to the magnitude thereof; and counting means for representing the difference between the number of pulses provided by said first means and the number of pulses provided by said second means.

17. The system defined by claim 16 including alarm means coupled to said counting means and adapted to be energized only when said difference exceeds a predetermined value.

18. Apparatus responsive to the direction and magnitude of angular deviation of the heading of a navigable body from a predetermined course line for facilitating the return of said body to said course line, said apparatus including:

first means responsive to an angular deviation in a first direction from said predetermined course for providing pulses at a rate related to the magnitude thereof;

second means responsive to an angular deviation in a second direction from said predetermined course for providing pulses at a rate related to the magnitude thereof; and first and second indicator means respectively responsive to said pulses provided by said first and second means for presenting an indication of the occurrence of each of said pulses.

19. Apparatus responsive to the direction and magnitude of angular deviation of the heading of a navigable body from apredetermined course line for facilitating the return of said body to said course line, said apparatus including:

a magnetic sensing means for detecting components of the earth's magnetic field along a defined axis bearing a fixed relationship to said heading and for providing an error signal defining the magnitude and direction of angular deviation of said heading from said predetermined course line; and means responsive to said error signal respectively defining opposite first and second directions of angular deviation for providing first and second pulse trains whose pulses occur at a rate related to said magnitude of angular deviation.

20. The system defined by claim 19 and further including adjustable threshold means for selectively establishing the minimum angular deviation at which said means responsive to said error signal is responsive.

21. Apparatus responsive to the direction and magnitude of angular deviation of the heading of a navigable body from a predetermined course line for facilitating the return of said body to said course line, said apparatus including:
- a magnetic sensing means for detecting components of the earth's magnetic field along a defined axis bearing a fixed relationship to said heading and for providing an error signal defining the magnitude and direction of angular deviation of said heading from said predetermined course line;
- means responsive to said error signal respectively defining opposite first and second directions of angular deviation for providing first and second pulse trains whose pulses occur at a rate related to said magnitude of angular deviation; and
- means responsive to said pulse trains for modifying the heading of said navigable body to equalize the number of pulses contained in each of said pulse trains during a finite time period.

22. A method of controlling the heading of a navigable body to maintain it on an intended course line including the steps of:
- generating a first set of pulses at a rate related to the angular deviation in a first direction of the heading of said body from said intended course line;
- generating a second set of pulses at a rate similarly related to the angular deviation in a second direction of the heading of said body from said intended course line; and
- controlling the heading of said body to equalize the number of pulses contained in said first and second sets of pulses during a finite time period.

23. Apparatus responsive to an angular deviation of the heading of a navigable body from a predetermined course line for facilitating the return of said body to said course line, said apparatus including:
- a magnetic sensing means for detecting components of the earth's magnetic field along a defined axis bearing a fixed relationship to said heading and for providing an error signal defining the magnitude and direction of angular deviation of said heading from said predetermined course line;
- means responsive to said error signal for developing a manifestation representing the accumulated distance of said body from said course line; and
- means responsive to said manifestation for modifying the heading of said navigable body to reduce the value thereof to substantially zero.

24. Apparatus responsive to an angular deviation of the heading of a navigable body from a predetermined course line for facilitating the return of said body to said course line, said apparatus including:
- a magnetic sensing means for detecting components of the earth's magnetic field along a defined axis bearing a fixed relationship to said heading and for providing an error signal defining the magnitude and direction of angular deviation of said heading from said predetermined course line;
- means responsive to said error signal for developing a manifestation representing the accumulated distance of said body from said course line; and
- means for displaying the value of said manifestation.

25. The apparatus of claim 24 wherein said means for developing said manifestation includes means for providing a succession of pulses at a rate determined by the magnitude of said angular deviation; and
- means for counting said pulses.

References Cited
UNITED STATES PATENTS

| | | | |
|---|---|---|---|
| 2,485,847 | 10/1949 | Schmitt | 340—26 |
| 3,079,586 | 2/1963 | Gunn | 340—26 |
| 3,183,603 | 5/1965 | Trenchard | 33—224 |
| 3,040,248 | 6/1962 | Geyger | 324—43 |
| 3,131,340 | 4/1964 | Johnson et al. | 318—489 X |
| 3,167,698 | 1/1965 | Gray et al. | 33—222 X |

THOMAS B. HABECKER, *Acting Primary Examiner.*

NEIL C. READ, *Examiner.*

A. H. WARING, *Assistant Examiner.*